J. F. CRAVEN.
GREASE CUP.
APPLICATION FILED AUG. 3, 1916.

1,234,635.

Patented July 24, 1917.

WITNESSES

INVENTOR
James F. Craven

UNITED STATES PATENT OFFICE.

JAMES F. CRAVEN, OF PITTSBURGH, PENNSYLVANIA.

GREASE-CUP.

1,234,635.      Specification of Letters Patent.      Patented July 24, 1917.

Application filed August 3, 1916. Serial No. 112,927.

*To all whom it may concern:*

Be it known that I, JAMES F. CRAVEN, a resident of Pittsburgh, in the county of Allegheny and State of Pennsylvania, have invented a new and useful Improvement in Grease-Cups, of which the following is a specification.

This invention relates to automatic grease cups, such as are used for feeding grease into bearings. The objects of the invention are to provide a grease cup which is of simple form, comprising a small number of parts which may be made at low cost, and which may easily be assembled into grease cups of compact form and small size. A further object is to provide such a device in a form which may be readily filled when empty, which automatically feeds grease to the bearing or other parts to be lubricated. More particularly, it is designed to provide a device having the above noted characteristics in which a constant pressure will be maintained upon the grease in the cup during the entire operation of emptying it.

Further objects of the invention, as well as the many uses and advantages thereof, will be apparent to those familiar with the art, and will in part appear in the following specifications.

Figure 2:
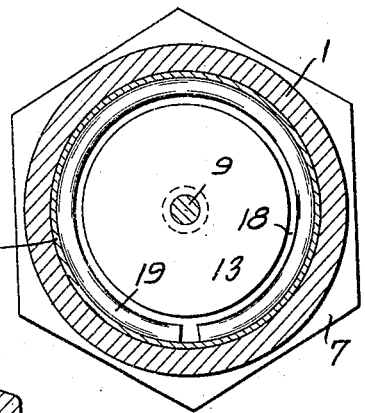
Figure 1:
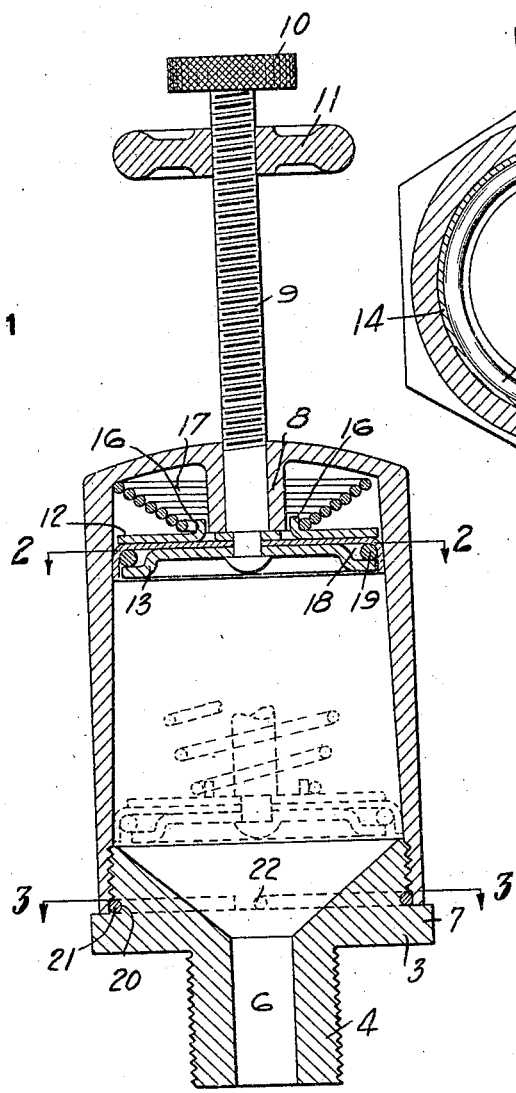
Figure 3:
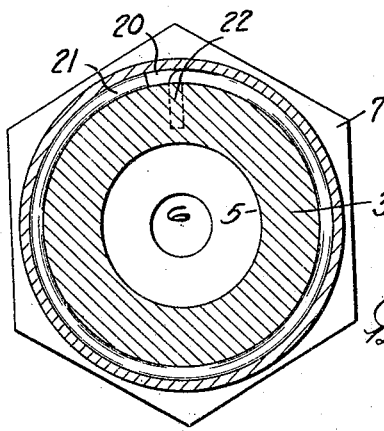

Referring to the drawings, Figure 1 shows a central vertical section through the complete device; Fig. 2 shows a horizontal section on the line 2—2 of Fig. 1; and Fig. 3 shows a horizontal section on the line 3—3 of Fig. 1.

For the lubrication of parts of machines which are in constant use, and especially bearings which from their nature require a very heavy form of lubricant, grease cups have been provided in which a heavy, thick lubricant is retained in a chamber and to which pressure is applied to force the lubricant into the bearing. Automatic means of continuously applying this pressure without the attention of the operator have been provided, comprising springs which exert a force on top of the contents of the grease cup. A difficulty encountered in such constructions has been that when the cup was entirely filled the pressure of the spring operated member thereon has been greater than when the cup was nearly empty, due to the fact that the spring when partially expanded becomes weakened, as will be obvious. It is highly desirable that the pressure on the lubricant be maintained constant throughout the entire emptying of the cup, so that the supply to the bearing may be accurately adjusted and maintained at a constant rate. The present invention secures this important function, as well as others, by the construction below described.

The grease cup comprises a casing 1, having a central, tapered bore 2, which is threaded on the inside at its open end in order to form a threaded joint with a base member 3, which has a threaded extension 4, adapted to be screwed into a threaded hole in the part to be lubricated. This base member has a sloping inner surface 5, forming a conical bottom for the grease cup, and a central bore 6, forming an outlet therefrom to the bearing. The body portion 7 of the base member is preferably made hexagonal, or square, so that it may be engaged by a wrench for securely fastening it to the member being lubricated. The upper wall of the casing 1 has an inwardly extending projection 8, which has a horizontal bore therethrough, forming a retaining guide for the plunger 9, which is threaded throughout, and has an upper terminal knurled head 10, and which carries a lifting nut 11 engaging the threads on the plunger. The lower end of the plunger carries a follower fitted to the interior of the casing 1, consisting of a circular metal plate 12, and a lower plate 13, having clamped therebetween a flexible member, such as a leather washer, 14. These members are rigidly attached to the plunger by means of a rivet extension 15, as shown in the drawings. The plate 12 has small tongues 16 turned up near its central portion, to form a retaining seat for the coil spring 17, which bears against the follower and against the top of the casing, exerting pressure downwardly on the former. The outer edge of the plate 13 is bent downwardly and then outwardly to form an annular recess 18, and in this space an expansion ring 19 is placed. The flexible member 14 is turned downwardly at its outer edge so as to form a folded forward extension at the sides of the follower, and this folded portion is pressed outwardly against the wall of the casing by the expansion ring 19, as will be obvious. In addition to forming a friction bearing against the casing wall, the member 14 forms a tight bearing of the follower in the cup, and prevents any grease escaping therefrom to the rear of the follower.

The operation of the device is as follows: The plunger and follower have been withdrawn to the position shown in Fig. 1, and locked therein as below explained. The base 3 is removed and the cup filled with grease. The base is then replaced and is securely fastened in the part to be lubricated. The lifting nut 11 is then withdrawn to the position shown in Fig. 1, which allows the full force of the spring 17 to bear against the follower, exerting the required pressure on the top of the lubricant, which is thereby forced through the passage 6 into the bearing.

The expansion ring 19 is compressed so as to have a strong outward force at the upper end of the casing bore, but as the follower passes downward therein, the ring expands toward its normal shape and is so constructed that at the bottom limit of travel, shown in dotted lines in Fig. 1, the ring is practically returned to normal size, and has lost its force of expansion. The result is that at the upper limit of the follower there is a strong forcing of the flexible member 14 against the wall of the casing, but this force constantly decreases as the bore of the casing becomes larger in the downward travel of the follower. This variation in friction against the casing wall compensates for the weakening of the spring 17 toward the lower limit of its expansion. The result is that there is a constant uniform pressure of the follower upon the contents of the grease cup, the effective strength of the propelling spring being rendered constant by opposition of the decreasing friction of the follower on the walls of the casing.

Grease cups of this character are frequently applied to machinery in which there is a considerable vibration. This tends to shake loose the cup from its base and to allow leakage of the lubricant. In order to prevent this an annular groove 20 is provided in the base portion 3 just above the main body portion, and just below the cup-engaging threads. In this groove is seated an expanding ring 21, having one end turned inwardly forming an extension 22, which is engaged by a hole bored in the base member 3, as shown in Fig. 3. The other end of the ring 21 is free, and bears outwardly against the wall of the grease cup when that member is in position. The effect of this expanding ring is much the same as a ratchet. When the cup is screwed on, the ring is compressed and offers no opposition to rotation in that direction. But when the cup is turned in the opposite direction it tends to expand the ring, and considerable force is necessary to overcome the friction of the expanding ring against the wall of the cup.

The plunger 9 moves freely up and down throughout the extension 8. After the cup has been emptied the plunger is withdrawn against the pressure of the spring 17, and the lifting nut 11 is turned to the lower limit of its travel on the plunger, locking the follower in raised position, thus permitting the filling of the cup with grease and closure with the base member without the necessity of holding the follower in position by hand.

This invention provides a grease cup which automatically feeds at a constant rate, in which the number of parts is reduced to a minimum, which may be easily manufactured and assembled, which is entirely dependable and which does not get out of order, and which may be manufactured at a comparatively small cost.

I claim:—

1. An automatic grease cup, comprising a taper bored casing for attachment to the part to be lubricated, a follower in the casing, a spring bearing upon the follower, and means within the cup to maintain a constant pressure of the follower on the contents of the cup throughout its travel therein.

2. An automatic grease cup, comprising a casing for attachment to the part to be lubricated, a follower in the casing, a spring behind the follower, and means comprising a decreasing friction device to maintain a constant pressure of the follower on the contents of the casing throughout its travel therein.

3. An automatic grease cup, comprising a casing for attachment to the part to be lubricated, a follower in the casing, a spiral spring behind the follower, and frictional means to maintain a constant pressure of the follower on the contents of the casing throughout its travel therein, comprising an expansion device adapted to engage the casing wall with decreasing pressure as the follower travels in the casing.

4. An automatic grease cup, comprising a tapered casing for attachment to the part to be lubricated, a follower in the casing, a spring behind the follower and means to maintain a constant pressure of the follower on the contents of the casing throughout its travel therein, said means comprising an expansion device adapted to exert decreasing pressure against the casing walls as the follower travels therein.

5. An automatic grease cup, comprising a tapered casing for attachment to the part to be lubricated, a follower in the casing comprising rigid plate members having a flexible member clamped therebetween overlapping and extending ahead of the lower plate member and a circular spring pressing the overlapping portion of the flexible member against the bore of the chamber, and a spring driving the follower against the contents of the cup.

6. An automatic grease cup, comprising a taper bored casing for attachment to the part to be lubricated, a follower in the casing, a spring behind the follower, means to maintain constant pressure of the follower on the contents of the casing throughout its travel therein, and means to withdraw the follower and lock it in withdrawn position.

7. In an automatic grease cup, comprising a tapered casing having a spring-operated follower therein with frictional means to render pressure of the follower upon the contents of the cup constant throughout its travel, the combination of a base closing the casing and adapted to be fastened to the device to be lubricated and a spring having one end fixed in the base and its body lying in a groove therein with free end and body in contact with the casing and adapted to be expanded by rotation of the casing in the unlocking direction.

In testimony whereof, I have hereunto set my hand.

JAMES F. CRAVEN.

Witnesses:
 Jo. BAILY BROWN,
 G. H. LERESCHE.

Copies of this patent may be obtained for five cents each, by addressing the "Commissioner of Patents, Washington, D. C."